United States Patent
Deinzer

(10) Patent No.: US 6,990,329 B2
(45) Date of Patent: Jan. 24, 2006

(54) METHOD FOR TRANSMITTING EMERGENCY CALL MESSAGES IN A RADIO COMMUNICATIONS SYSTEM

(75) Inventor: Arnulf Deinzer, Kempten (DE)

(73) Assignee: Siemens Aktiengesellschaft, Munich (DE)

( * ) Notice: Subject to any disclaimer, the term of this patent is extended or adjusted under 35 U.S.C. 154(b) by 325 days.

(21) Appl. No.: 10/343,635

(22) PCT Filed: Jul. 27, 2001

(86) PCT No.: PCT/DE01/02856

§ 371 (c)(1),
(2), (4) Date: Feb. 3, 2003

(87) PCT Pub. No.: WO02/11483

PCT Pub. Date: Feb. 7, 2002

(65) Prior Publication Data

US 2003/0176180 A1    Sep. 18, 2003

(30) Foreign Application Priority Data

Aug. 2, 2000   (DE) ............................... 100 37 740

(51) Int. Cl.
*H04M 11/04* (2006.01)

(52) U.S. Cl. .................................................. 455/404.1

(58) Field of Classification Search ............. 455/404.1; 370/7.31, 352
See application file for complete search history.

(56) References Cited

U.S. PATENT DOCUMENTS

| 5,533,019 A | 7/1996 | Jayapalan |
| 5,697,060 A | 12/1997 | Akahane |
| 2003/0176180 A1 * | 9/2003 | Deinzer ................... 455/404.1 |

FOREIGN PATENT DOCUMENTS

| EP | 0 679 041 A2 | 4/1995 |
| EP | 0 679 041 A3 | 4/1995 |
| WO | 98/31168 | 7/1998 |
| WO | 98/31180 | 7/1998 |

OTHER PUBLICATIONS

"CR for Cell Selection and EDGE Compact Control Channel impacts on GSM 04.60" (Tdoc SMG2 EDGE 298/99), ETSI EDGE Workshop, Paris, Aug. 24-27, 1999, pp. 156-161.

* cited by examiner

Primary Examiner—William D. Cumming
(74) Attorney, Agent, or Firm—Staas & Halsey LLP

(57) ABSTRACT

At least one of voice and data information is transmitted in connection mode via a radio interface in first radio zones. In second radio zones, voice or data information is transmitted exclusively in packet mode via a radio interface. When an emergency call is issued by a subscriber station from one of the first radio zones, a voice and/or data connection is established between the subscriber station and an emergency control center. When an emergency call is issued by a subscriber station from one of the second radio zones, at least one piece of emergency information which identifies the second radio zone is transmitted to an emergency control center.

12 Claims, 3 Drawing Sheets

METHOD FOR TRANSMITTING EMERGENCY CALL MESSAGES IN A RADIO COMMUNICATIONS SYSTEM

CROSS REFERENCE TO RELATED APPLICATIONS

This application is based on and hereby claims priority to German Application No. 100 37 740.8 filed on Aug. 2, 2000, the contents of which are hereby incorporated by reference.

BACKGROUND OF THE INVENTION

Until now, it has been possible to send emergency call messages only from radio cells in which connection-oriented services are available. A document (Tdoc SMG2 EDGE 298/99) which was submitted at the ETSI SMG2 EDGE Workshop from Aug. 24 to 27, 1999 in Paris relates to the sending of emergency call messages from areas of a radio communications system in which only packet-oriented services or only connection-oriented services are available in some radio cells while, in contrast, packet-oriented and connection-oriented services are available in other radio cells. This document proposes that, when an emergency call message is to be sent from a subscriber station in a radio cell with exclusively packet-oriented services, a handover process be initiated for this subscriber station, with the aim of associating the relevant subscriber station with a radio cell with connection-oriented services.

In order to speed up the handover process, Section 11.2.19, page 160 requires that the subscriber station be informed via a signaling channel that connection-oriented services are not available in the originally selected radio cell. A message such as this is advantageous whenever, for example, connection-oriented services are available in one of the adjacent radio cells and this radio cell is selected by the handover process. However, if connection-oriented services are not available in any of the feasible radio cells, a procedure such as this runs into considerable problems.

SUMMARY OF THE INVENTION

The present invention is based on the object of specifying a method for transmitting emergency call messages which originate from a subscriber station in a radio cell in which no connection-oriented service is available.

One major aspect of the method according to the invention is that, in the case of an emergency call originating from a subscriber station in a radio cell in which at least one of speech and data information are transmitted exclusively in a packet-oriented manner via a radio interface, an emergency call center is signaled that an attempt has been made to set up a connection to an emergency call center in a radio cell in which no connection-oriented services are available. The aim in the signaling of the emergency call is to detect information that is as valid as possible about, for example, the location or the identity of a user who is sending the emergency call, and to transmit this to the emergency call center. A minimum requirement in this sense is thus the transmission of information which identifies the radio cell of the user who is sending the emergency call. According to one preferred development of the method according to the invention, a unidirectional speech information interchange also takes place, from the relevant subscriber station to the emergency call center.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
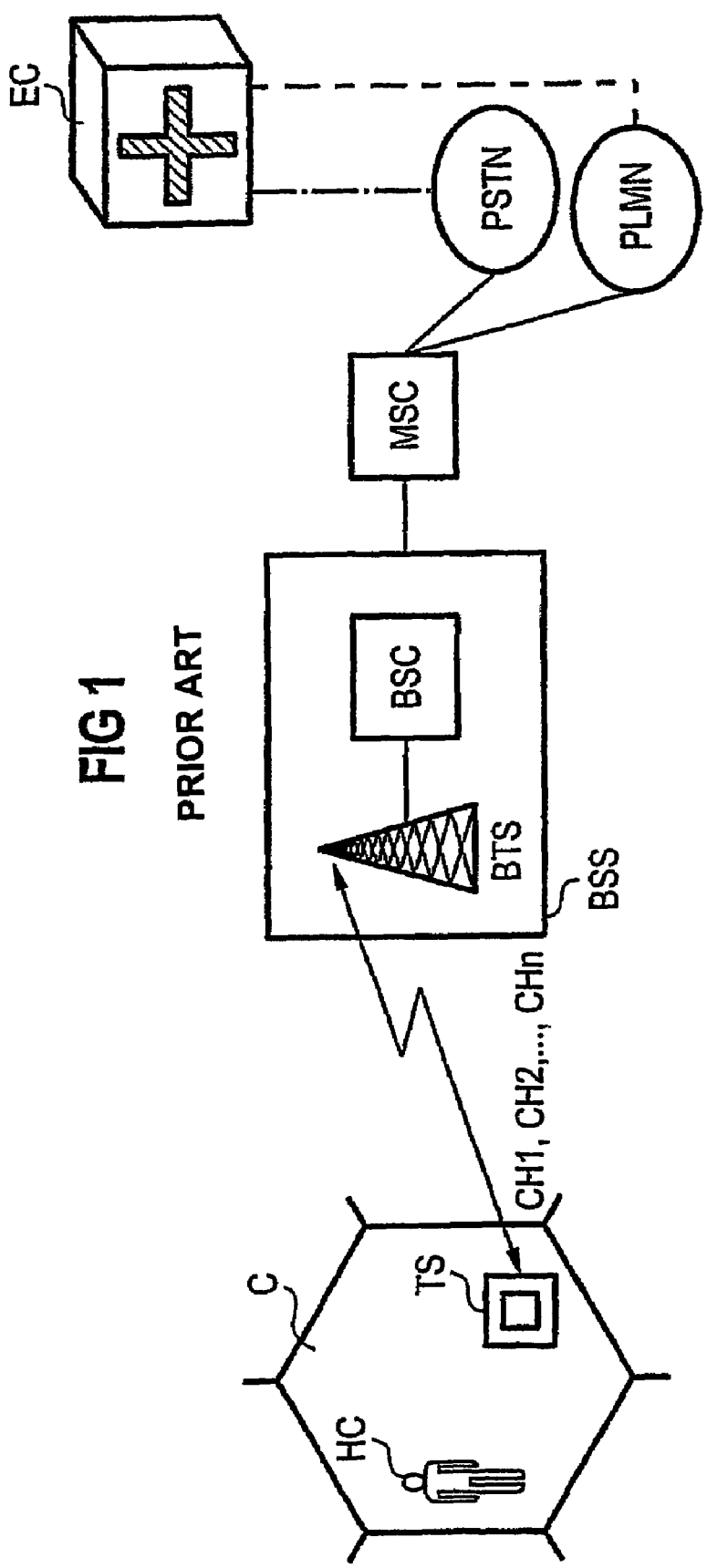
FIG. 1 is a block diagram of a conventional radio communications system, in which only connection-oriented services are available, having an emergency call center.

Reference will now be made in detail to the preferred embodiments of the present invention, examples of which are illustrated in the accompanying drawings, wherein like reference numerals refer to like elements throughout.

The structure of the radio communications system which is illustrated in FIG. 1 corresponds to that of a known GSM mobile radio network which has a large number of mobile switching centers MSC for connection-oriented services, which are networked to one another and allow access to a landline network PSTN or to some other radio communications network PLMN. The mobile switching centers MSC may be connected to an emergency call center EC either directly or indirectly via the landline network PSTN. A connection is also possible between the mobile switching centers MSC and the emergency call center EC via some other radio communications network PLMN.

Furthermore, the mobile switching centers MSC are connected to at least one base station controller BSC. Each base station controller BSC allows a connection to be set up to at least one base transceiver station BTS. Base station controllers BSC and associated base transceiver stations BTS are combined to form a base station subsystem BSS. A base transceiver station BTS may set up a unidirectional or bidirectional speech and/or data connection to a subscriber station TS via a radio interface. A large number of radio channels Ch1 to CHn are available at the radio interface for connection-oriented transmission of speech and/or data information within a radio cell C.

If an emergency caller HC sends an emergency call via a subscriber station TS, then the process of setting up the connection between the subscriber station TS of the emergency caller HC and the emergency call center EC is subject to numerous simplifications. These simplifications include, for example, higher-prioritized handling of the process of setting up the connection, dispensing with any check of information which is stored on a SIM card (Subscriber Identification Module) for granting of network or service access authorizations, or dispensing with terminal-identification-dependent blocking of access authorizations.

Figure 2:
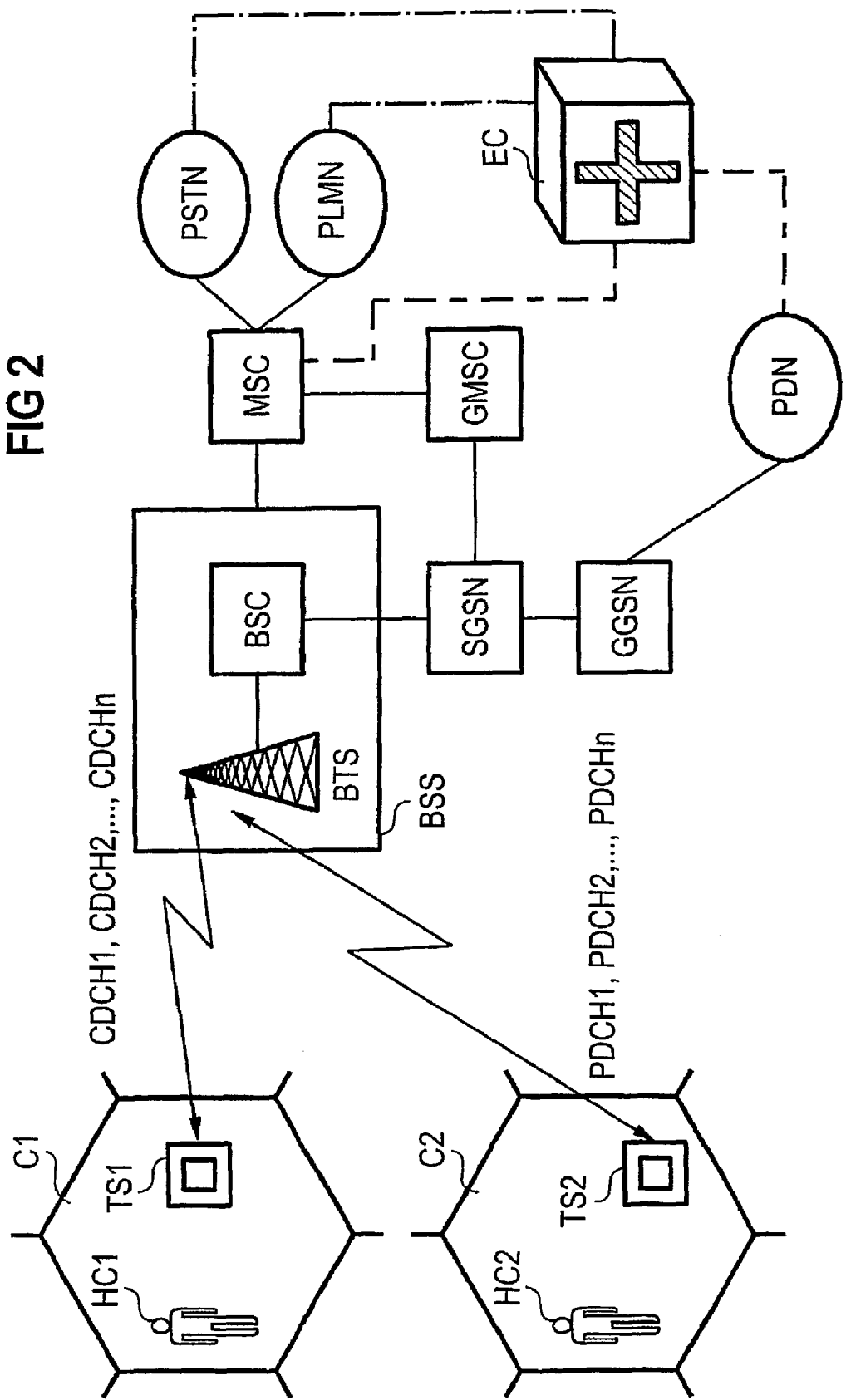
FIG. 2 is a block diagram of a radio communications system in which connection-oriented and packet-oriented services are available, having an emergency call center.

In the radio communications system illustrated in FIG. 2, packet-oriented services are also available, in addition to connection-oriented services. Packet-oriented services are used predominantly for the transmission of data information, while connection-oriented services are intended primarily for the transmission of speech information.

In GSM mobile radio systems by way of example, packet-oriented services are provided by GPRS (General Packet Radio Services). GPRS allows a theoretical data transmission rate of 182 kb/s. In practice, data transmission rates of 150 to 170 kb/s can be expected. In addition to the components which have already been illustrated in FIG. 1, the radio communications system which is illustrated in FIG. 2 has a number of additional components especially for packet-oriented services. For example, for packet-oriented services, the base station controller BSC is coupled to a packet data network PDN via a router SGSN (Serving GPRS Support Node) and a gateway GGSN (Gateway GPRS Support Node). The router SGSN is also coupled to a mobile switching center MSC via a further gateway GMSC.

There are a number of options, as shown in FIG. 2, for coupling an emergency call center EC to the radio communications system. Firstly, in the radio communications system illustrated in FIG. 1, the mobile switching centers MSC may be connected to an emergency call center EC either directly or indirectly via the landline network PSTN. By analogy with FIG. 1, a connection is also possible between the mobile switching centers MSC and the emergency call center EC via some other radio communications network PLMN. In addition to this, it is possible to couple the emergency call center EC directly to the packet data network PDN. In this case, the emergency call center EC could also be equipped with packet-data-processing terminals, which allow data packets to be converted to analog speech information.

Figure 3:
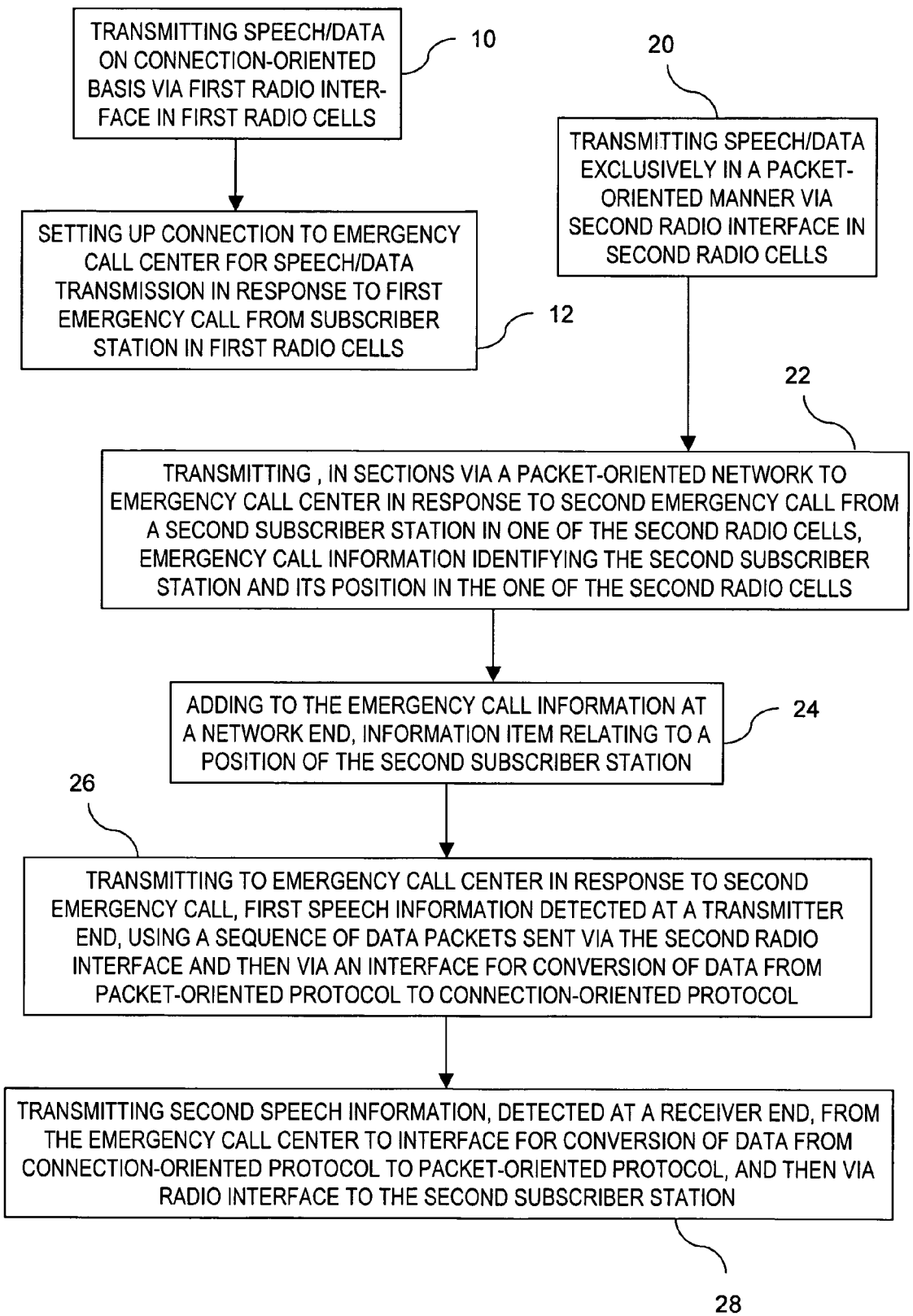
FIG. 3 is a flowchart of a method according to the present invention.

Depending on the requirements resulting from the network plan, scenarios are possible in which only connection-oriented or only packet-oriented services are available in some radio cells, and both types of service are available in other radio cells. It is thus possible for only packet-oriented services to be available in a chosen radio cell. FIG. 2 considers a scenario in which speech and/or data information can be transmitted 10 (FIG. 3) on a connection-oriented or packet-oriented basis via the radio interface in a first radio cell C1, while only packet-oriented services are available 20 in a second radio cell C2.

On the basis of the method according to the invention, when an emergency call occurs which is sent from a subscriber station TS1 of a first emergency caller HC1, a speech and/or data connection is set up 12 to the emergency call center EC via one or more of the radio channels CDCH1 to CDCHn, which are available in the first radio cell C1, for connection-oriented services. In the case of an emergency call which is sent from a subscriber station TS2 of a second emergency caller HC2 in the second radio cell C2, at least one emergency call information item which identifies the radio cell C2 is transmitted 22 to the emergency call center EC.

The emergency call information is, for example, transmitted at least in sections in a packet-oriented manner via radio channels PDCH1 to PDCHn, the base transceiver station BTS, the base station controller BSC, the router SGSN, the gateway GMSC and the mobile switching center MSC to the emergency call center EC.

Data which has until that point been transmitted in a packet-oriented manner is converted at the gateway GMSC to data based on a connection-oriented transmission protocol. As an alternative to the sketched procedure, it is possible to transmit the emergency call information via a further gateway GGSN and the packet data network PDN to the emergency call center EC. In this case, no transmission-protocol-dependent conversion is required for the data.

The emergency call information may also optionally identify the physical position of the subscriber station TS2 of an emergency caller HC2. Corresponding position information may be generated either at the network end from the knowledge of the microcell, nanocell or picocell in a radio network in which the emergency caller HC2 is currently located, or at the subscriber station end if, for example, a subscriber station TS2 is equipped with a GPS transmitter and receiver, and this position information can be added 24 to the emergency call information. If the emergency call information is also used to transmit to the emergency call center EC details relating to the identification of a subscriber station TS2, by which the emergency caller HC2 can also be indirectly identified, then these details can be used to access data recording devices which, for example, contain information relating to a debilitation pattern, profile or medication incompatibilities of a patient, to simplify the preparations for medical assistance measures, or, in particular, also to speed them up.

In addition to the transmission of emergency call information, it is also possible to receive analog speech information at the subscriber station TS1, TS2 of an emergency caller HC2, for this information to be converted to digital packets, and to be transmitted to the emergency call center EC. The analog speech information may in this case be transmitted 26, for example, via a VoIP connection (Voice over Internet Protocol) or by a tone file (wave file). A speech information interchange such as this may be carried out both unidirectionally from the subscriber station TS2 of an emergency caller HC1, HC2 to the emergency call center EC and bidirectionally between the emergency call center EC and the subscriber station TS2. In the latter case, analogue speech information which is received at the emergency call center EC can be converted to digital data packets and can be transmitted 28 in a packet-data-oriented manner to the subscriber station TS1, TS2 for reproduction.

In order to signal to an emergency caller HC2 who is sending an emergency call from the second radio cell C2 by his subscriber station TS2 that, for example, only unidirectional emergency call connections or emergency call connections with restricted speech quality are possible from the second radio cell C2, the emergency caller HC2 is informed from the network end about a corresponding signaling channel in the sense of user guidance that only packet-oriented services are available in the chosen radio cell. Furthermore, emergency call data packets which have emergency call information that identifies the second radio cell HC2 and/or which contain speech information received at the subscriber station end are assigned an increased transmission priority.

The functionality and the structure of the radio communications system illustrated in FIG. 2 can in principle also be transferred to other radio communications systems in which the invention may be used, in particular for subscriber access networks with wire-free subscriber access. The use of the method according to the invention is thus not restricted to the exemplary embodiments described here.

The invention has been described in detail with particular reference to preferred embodiments thereof and examples, but it will be understood that variations and modifications can be effected within the spirit and scope of the invention.

What is claimed is:

1. A method for transmitting emergency call messages in a radio communications system, comprising:
   transmitting at least one of speech and data information on a connection-oriented basis via a first radio interface in first radio cells;
   transmitting at least one of speech and data information exclusively in a packet-oriented manner via a second radio interface in second radio cells;

setting up a connection between the subscriber station and an emergency call center for at least one of speech and data in response to a first emergency call originating from a first subscriber station in one of the first radio cells; and transmitting emergency call information to the emergency call center, in response to a second emergency call originating from a second subscriber station in one of the second radio cells, the emergency call information identifying the one of the second radio cells.

2. The method as claimed in claim 1, wherein the emergency call information is transmitted at least in sections in a packet-oriented manner to the emergency call center.

3. The method as claimed in claim 2, wherein the emergency call information is transmitted to the emergency call center via a network for packet-oriented data transmission.

4. The method as claimed in claim 3, wherein the emergency call information identifies a position of the second subscriber station from which the emergency call is signaled within the one of the second radio cells.

5. The method as claimed in claim 4, wherein, at a network end, an information item relating to a position of the second subscriber station from which the second emergency call is being signaled is generated and is added to the emergency call information.

6. The method as claimed in claim 4, wherein, at a subscriber station end, an information item relating to a position of the second subscriber station from which the second emergency call is being signaled is generated and is added to the emergency call information.

7. The method as claimed in claim 6, wherein the emergency call information contains details for identification of the second subscriber station from which the second emergency call is being signaled.

8. The method as claimed in claim 7, further comprising transmitting to the emergency call center, in response to the second emergency call originating from the second subscriber station, first speech information detected at a transmitter end, in a packet-data-oriented manner via the second radio interface and then via an interface for conversion of data based on a packet-oriented protocol to data based on a connection-oriented protocol.

9. The method as claimed in claim 8, further comprising transmitting second speech information, detected at a receiver end, from the emergency call center to an interface for conversion of data based on a connection-oriented protocol to data based on a packet-oriented protocol, and then via a radio interface to the second subscriber station.

10. The method as claimed in claim 7, wherein, for the second emergency call originating from the second subscriber station, first speech information detected at a transmitter end is converted to a sequence of data packets, and sent via a unidirectional connection to the emergency call center.

11. The method as claimed in claim 10, wherein, for the second emergency call originating from the second subscriber station, the second subscriber station is signaled that only packet-oriented services are available.

12. The method as claimed in claim 11, wherein emergency call data packets containing emergency call information at least one of identifying the one of the second radio cells and containing speech information detected at a second subscriber station end are assigned an increased transmission priority.

* * * * *